United States Patent [19]
Tsuchiya

[11] Patent Number: 5,353,283
[45] Date of Patent: Oct. 4, 1994

[54] GENERAL INTERNET METHOD FOR ROUTING PACKETS IN A COMMUNICATIONS NETWORK

[75] Inventor: Paul F. Tsuchiya, Lake Hopatcong, N.J.

[73] Assignee: Bell Communications Research, Inc., Livingston, N.J.

[21] Appl. No.: 69,275

[22] Filed: May 28, 1993

[51] Int. Cl.$^5$ .............................. H04L 12/56
[52] U.S. Cl. ..................... 370/60; 370/94.3
[58] Field of Search ............. 340/827; 370/16, 54, 370/60, 94.1, 94.3, 60.1, 85.13, 85.14

[56] References Cited

U.S. PATENT DOCUMENTS

| | | | |
|---|---|---|---|
| 4,933,937 | 1/1990 | Konish | 370/94.1 |
| 4,933,938 | 1/1990 | Sheehy | 370/35.13 |
| 5,008,882 | 4/1991 | Peterson et al. | 370/94.3 |
| 5,179,558 | 1/1993 | Thacker et al. | 370/60 |

OTHER PUBLICATIONS

Information Sciences Institute, RFC 791, "*Internet Protocol*," Sep. 1981.
W. Stallings, "*Handbook of Computer Communication Standards*," vol. 1, Chapter 5.5 (1990).
J. Moy, "OSP Version 2," RFC-1247, USC/Information Sciences Institute, Jul. 1991.
International Organization for Standardization ISO 10589, "Intermediate System to Intermediate System Intra-Domain . . . Connectionless-mode Network Serv." (ISO 8473).
J. M. McQuillan et al., "*The New Routing Algorithm for the ARPANET*," IEEE Trans. on Comm., vol. COM-28, No. 5, May 1980, pp. 711–719.
Z. Wang et al., "Shortest Path First With Emergency Exits," Proc. of SIGCOMM (1990).
S. E. Deering, "Multicast Routine in Internetworks and Extended LANs," Sigcomm, pp. 55–64, Aug. 1988.

*Primary Examiner*—Benedict V. Safourek
*Attorney, Agent, or Firm*—Leonard Charles Suchyta; Stephen M. Gurey

[57] ABSTRACT

A method for transmitting a packet via a sequence of nodes in a network is disclosed. The transmitted-packet contains a sequence of one or more identifiers in a sequence of fields 410, 420, 430, 440, 450, 460, 470, 480 and a pointer pointing to a particular identifier in the sequence of identifiers in a field 485 of a routing section of a header in the packet. A node of the sequence of nodes at which the packet is located selects a forwarding table from a set of forwarding tables maintained in a memory at that node. The node then retrieves an entry from the selected forwarding table indexed by the identifier in the sequence of identifiers pointed to by the pointer. The node then transmits the packet to the next node of the sequence of nodes indicated by the retrieved forwarding table entry.

24 Claims, 5 Drawing Sheets

FIG. 2
(PRIOR ART)
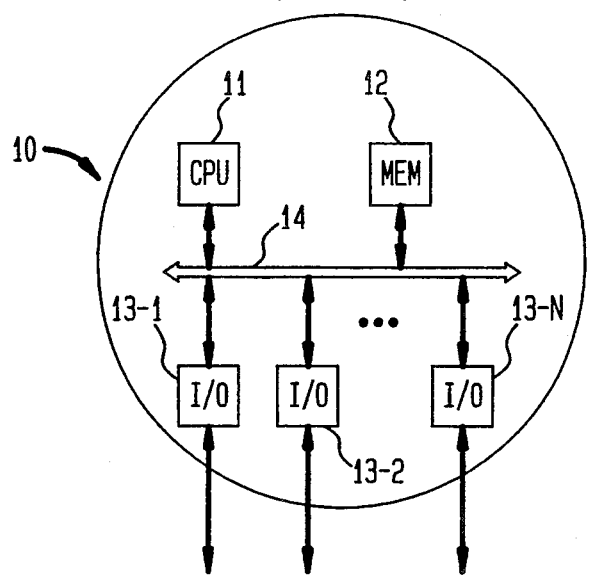
FIG. 3
(PRIOR ART)
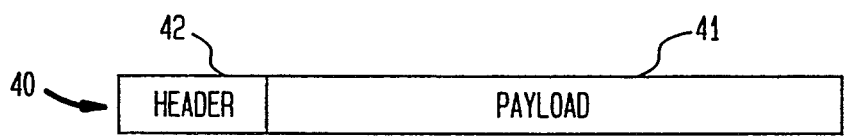
FIG. 4
(PRIOR ART)
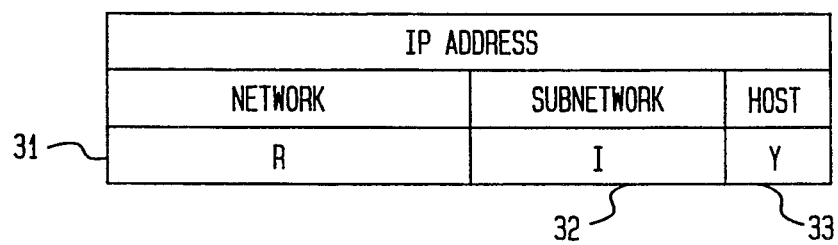
FIG. 5
(PRIOR ART)

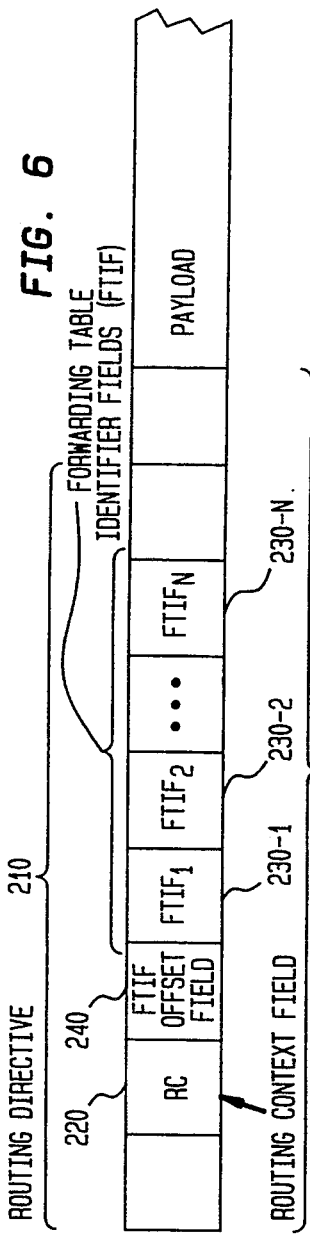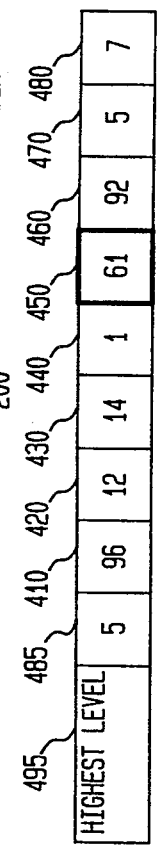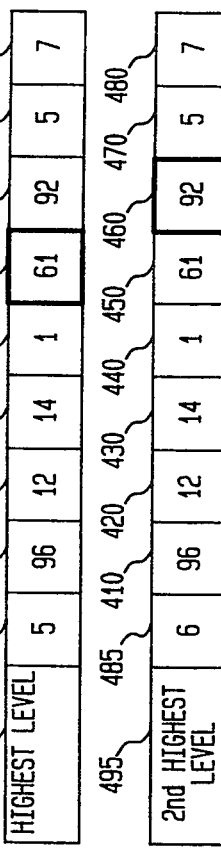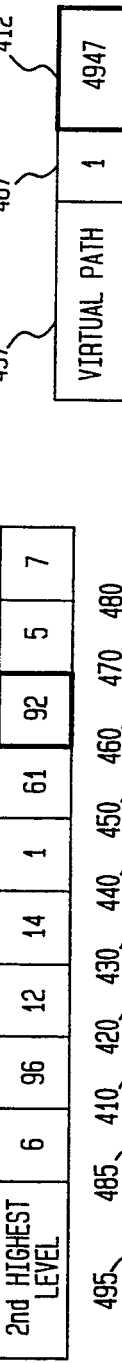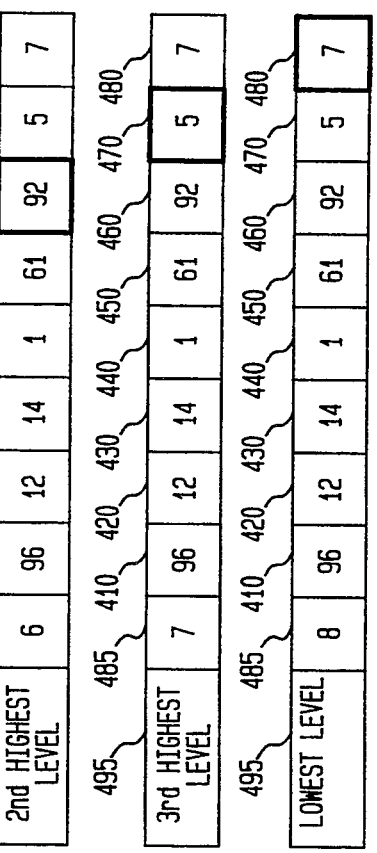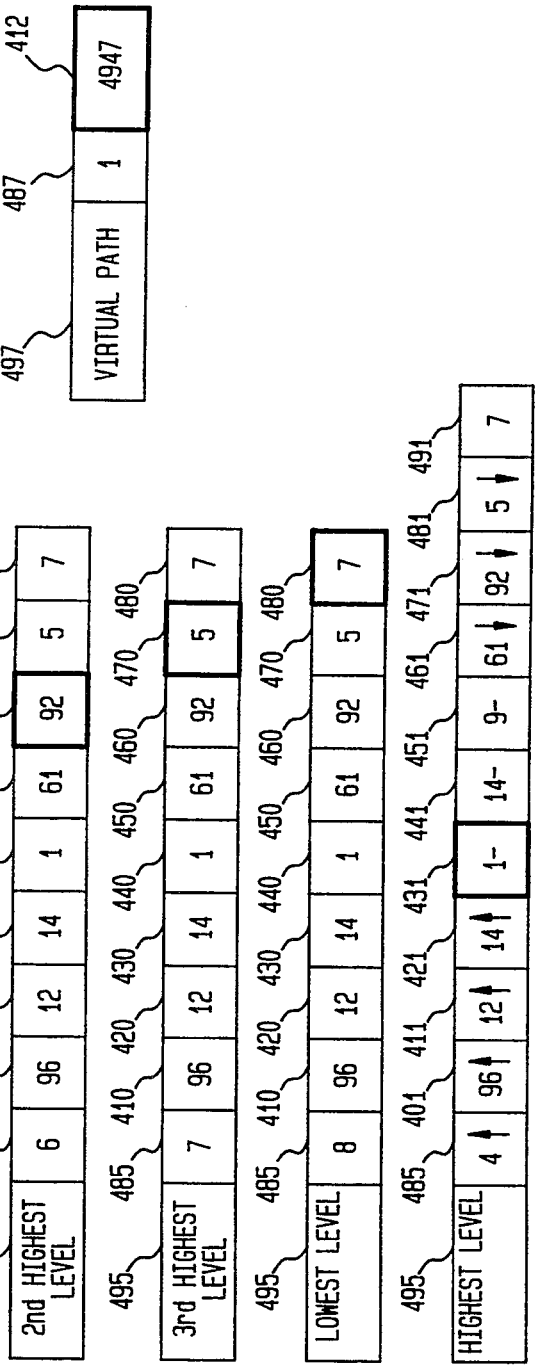

GENERAL INTERNET METHOD FOR ROUTING PACKETS IN A COMMUNICATIONS NETWORK

RELATED APPLICATION

U.S. patent application Ser. No. 08/033,638 entitled "Method and System for Shortcut Routing over Public Data Networks" was filed on Mar. 16, 1993 for Paul Tsuchiya and is assigned to the assignee hereof. The aforementioned application contains matter related to the subject matter of the present application and is incorporated herein by reference.

1. Field of the Invention

The present invention relates to communicating in a large communications network called an internet which includes several interconnected networks. Each interconnected network includes one or more interconnected nodes. Communication between two nodes of the internet is achieved by transmitting a bitstream organized into packets between the two nodes. In particular, the present invention relates to a general, fully flexible method for routing packets in the internet.

2. Background of the Invention

An internet communications network 100 is depicted in FIG. 1 including five transit or backbone networks A, S, C, D, and E and three stub networks R, Y, and Z. A "backbone" network is an intermediary network which conveys communicated data from one network to another network. A "stub" network is a terminal or endpoint network from which communicated data may only initially originate or ultimately be received. Each network, such as the stub network R, includes one or more interconnected subnetworks I, J, L and M. As used herein, the term "subnetwork" refers to a collection of one or more nodes, e.g., (d), (a) (b, x, y), (q, v) (r, z), (s, u), (e, f, g), (h, i), (j, k, l), (m, n), and (o, p), interconnected by wires and switches for local internodal communication. Each subnetwork may be a local area network or LAN. Each subnetwork has one or more interconnected nodes which may be host computers ("hosts") u, v, w, x, y, z or routers a, b, c, d, e, f, g, h, i, j, k, l, m, n, o, p, q, r, s. A host is an endpoint node from which communicated data may initially originate or ultimately be received. A router is a node which serves solely as an intermediary node between two other nodes; the router receives communicated data from one node and retransmits the data to another node. Collectively, backbone networks, stub networks, subnetworks and nodes are referred to herein as "internet systems".

FIG. 2 shows a block diagram of a host or router node 10. As shown, the node may include a CPU 11, a memory 12 and one or more I/O ports 13-1, 13-2, . . . , 13-N connected to a bus 14. Illustratively, each I/O port 13-1, 13-2, . . . , 13-N is connected by wires, optical fibers, and/or switches to the I/O port of another node. The I/O ports 13-1, 13-2, . . . , 13-N are for transmitting communicated data in the form of a bitstream organized into one or more packets to another node and for receiving a packet from another node. An exemplary packet 40 is shown in FIG. 3 having a payload 41 which contains communicated data and a header 42 which contains control and/or address information.

A host which initially generates a packet for transmission to another node is called the source node and a host which ultimately receives the packet is called a destination node. Communication is achieved by transferring packets via a sequence of nodes including the source node, zero or more intermediary nodes, and the destination node, in a bucket brigade fashion. For example, a packet may be communicated from the node w to the node x by transferring the packet from the node w to the node c, to the node d, to the node b, and to the node x.

For purposes of communication, there are three fundamental categories of functions performed by each node:

(1) identification of source and destination nodes
(2) routing, i.e., transferring packets to another node
(3) handling packets, which includes all functions not falling into categories (1) and (2) such as prioritizing each packet received at a node for retransmission, etc.

The performance of these functions is effected by control information written by a transmitting node in the header of the packet. In particular, the performance of these functions in a conventional internet depends on unique internet addresses associated with the source and destination nodes and "Quality of service" information written in the header. Internet addresses and Quality of Service information as well as their effects on the identification, routing and handling functions are described in greater detail below.

In an exemplary internet protocol called IP, each node the internet 100 is assigned an internet address which is unique over the entire internet 100 such as the internet address for the node y shown in FIG. 4. See, Information Sciences Institute, RFC 791 "Internet Protocol", September, 1981. The IP addresses are assigned in a hierarchical fashion; the internet address of each node contains an address portion 31 indicating the network of the node, an address portion 32 indicating the subnetwork of the node, and a host portion 33 which identifies a particular host or router and discriminates between the individual nodes within a particular subnetwork.

In a conventional internet 100 which uses the IP protocol, the IP addresses of the source and destination nodes are placed in the packet header 42 by the source node. A node which receives a packet can identify the source and destination nodes by examining these addresses.

In a conventional internet which uses the IP protocol, packets are routed in a hierarchical fashion by parsing the destination address of the packet at each node. Illustratively, this is achieved using a binary search tree. That is, each node which receives a packet first compares the network field 31 of the destination address with the network field of its own destination address. If they are different, the receiving node accesses an entry of a forwarding table indexed by the network portion of the address and transfers the packet to the node indicated by the retrieved entry. For example, if the node e (with internet address 'AKe') receives a packet destined to the node x, (with destination address 'Rlx') the node e would compare the network portion 'R' of the destination address of the packet to the network portion of its own destination address 'A' and determine that the packet must be routed using a forwarding table appropriate for routing packets to another network. Such a table 50 is shown in FIG. 5. The node e would then retrieve the entry 51 corresponding to the network portion of the address 'R' which indicates that the packet should be routed to the node c. Illustratively, routing tables are constructed such that the retrieved entry indexed by the portion of the address of the destination node indicates the next node on a predetermined route to the destination node.

If the network portions of the addresses are the same, the node then compares the subnetwork portion 32 of the packet's destination address to the subnetwork portion of the node's address. If they are different, the node uses the subnetwork portion of the address to retrieve an entry from another forwarding table which indicates the next node to which the packet must be transferred. If they are identical, the node then uses the host portion 33 of the address to retrieve an entry from yet another forwarding table which indicates the next node to which the packet must be transferred.

A node may place information in a packet header 42 specifying a particular "Quality of Service" or QOS. For example, a node may place QOS information specifying "low delay" packet transfer. A node which receives such a packet may selectively route the packet to a node on a low delay route to the destination node rather than a node on a high delay route in order to achieve a "low delay" packet routing. Alternatively, or additionally, the node may "handle" the packet internally in a different manner to achieve a low delay packet handling. For example, the node may prioritize the received packet so that it is retransmitted before other previously received packets, thereby reducing the delay experienced by the packet at the receiving node.

The conventional internet is disadvantageous because only one specific style of routing, e.g., hierarchical routing, is easily supported by the current packet structure and packet transfer protocol. Thus, the conventional internet does not readily permit a source node to specify the entire route or manner via which a packet is routed. Nor is it simple for an intermediary node to redirect a packet via an alternate sequence of nodes, e.g., in order to avoid congestion in the internet. Second, the source and destination node identification, routing and handling functions are performed arbitrarily in the conventional internet. For example, if low delay quality of service is specified in the packet, it is difficult to predict whether a node will handle the packet with a low delay or route the packet along a low delay route in order to achieve a low delay.

It is therefore an object of the present invention to overcome the disadvantages of the prior art.

SUMMARY OF THE INVENTION

These and other objects are achieved by the present invention which provides a general method and system for routing a packet in an internet. According to one embodiment of the present invention, packets are not routed by parsing the destination address of the packet at each node. Rather, a sequence of identifiers suitable for use in indexing a forwarding table at each node is written in a special routing section of the header of the transmitted packet. The sequence of identifiers defines a "loose source route" or approximate route which may be used by nodes in routing the packet. Each identifier of the sequence of identifiers is successively activated as the packet nears its destination. Thus, as the packet nears its destination, the nodes will route the packet based on successive identifiers of the sequence in the packet header.

More particularly, a source node according to this embodiment of the invention writes a sequence of one or more identifiers and a pointer pointing to a particular identifier in the sequence of identifiers in a special routing section of the packet header. The source node routes the packet by selecting a forwarding table from a set of forwarding tables maintained in a memory at the source node. The source node accesses the selected forwarding table using the identifier in the sequence of identifiers pointed to by the pointer as an index. The source node retrieves the forwarding table entry indexed by this identifier and transmits the packet to a second node indicated by the retrieved forwarding table entry.

When the packet is received by an intermediary node, the intermediary node also uses the identifier of the sequence of identifiers in the packet header pointed to by the pointer as an index to access a forwarding table maintained in a memory at that intermediary node. In a similar fashion as the source node, the intermediary node routes the packet by first selecting a forwarding table from a set of forwarding tables maintained in a memory at the intermediary node. Then the intermediary node retrieves the indexed forwarding table entry. In addition to indicating the next mode to which the packet must be transmitted, the forwarding table entry may have an appropriate instruction stored therein for causing the pointer in the packet header to point to a different identifier, e.g., the next identifier, in the sequence of identifiers. If such is the case, the intermediary node modifies the pointer appropriately. Thus, the next node that receives the packet will use the identifier pointed to by the modified pointer (e.g., the next identifier in the sequence) for routing the packet. The intermediary node then transmits the packet to the node indicated by the indexed forwarding table entry. This process is repeated until the packet arrives at the destination node.

Illustratively, identifiers used for routing the packets are assigned to all internet systems (i.e., backbone networks, stub networks, subnetworks, and nodes) in the internet. In such a case, the sequence of identifiers written by the source node in the packet header corresponds to internet systems traversed by the packet in the order from the source node to the destination node. If the identifiers are assigned to all internet systems, they may illustratively be assigned in a hierarchical fashion although this is merely illustrative.

According to another embodiment of the invention, the special routing section of the packet includes a routing context field for controlling the routing of the packet in the internet. The routing context field includes a plurality of subfields, each of which may control an aspect of routing such as a particular QOS. Collectively, the subfields form a parameter which selects a particular forwarding table of a set of forwarding tables maintained in a memory at each node. Thus, when a node receives a packet, the node accesses the particular forwarding table selected by the parameter stored in the routing context field in order to route the packet.

In short, the present invention provides a routing method which is very flexible and is easily adapted to achieve different routing criteria and styles.

BRIEF DESCRIPTION OF THE DRAWING

FIG. 2 depicts a conventional node.
FIG. 3 depicts a conventional packet structure.
FIG. 4 depicts a conventional IP address.
FIG. 5 depicts a conventional forwarding table.
FIG. 6 depicts a packet header according to the present invention.

FIG. 8 depicts a routing directive of an exemplary packet transmitted between two nodes of the internet in FIG. 7.

FIG. 9 depicts the routing directive of FIG. 8 as modified by a node in the internet of FIG. 7.

FIG. 10 depicts the routing directive of FIG. 9 as further modified by a node in the internet of FIG. 7.

FIG. 11 depicts the routing directive of FIG. 10 as yet even further modified by a node in the internet of FIG. 7.

FIG. 12 depicts a routing directive for policy routing.

FIG. 13 depicts a routing directive for virtual path routing.

DETAILED DESCRIPTION OF THE INVENTION

Figure 1:
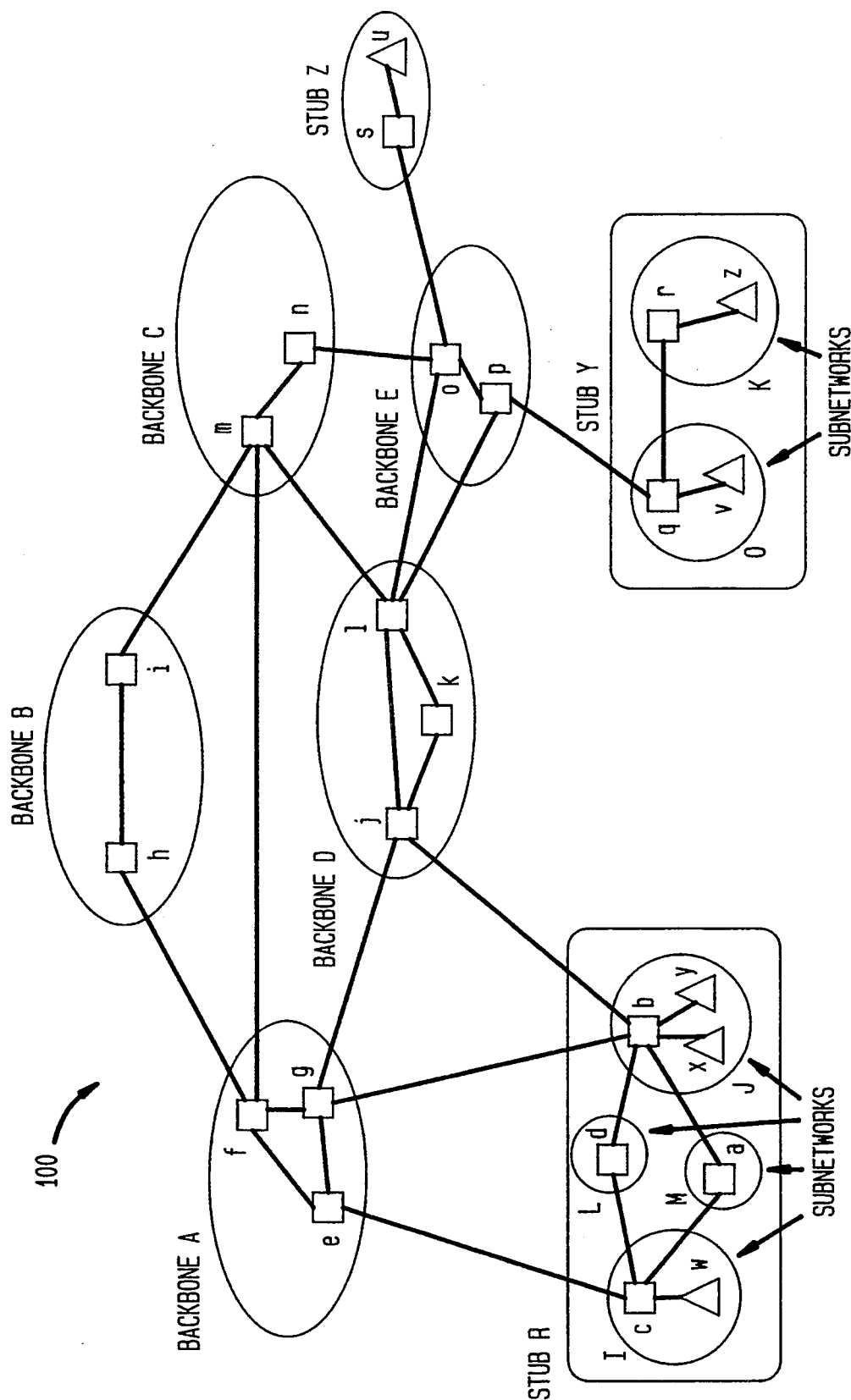
FIG. 1 depicts a conventional internet.

FIG. 6 depicts a packet header 200 according to the present invention. The packet header 200 has a section 210 called a routing directive devoted to control information used exclusively for routing. The routing directive 210 illustratively has a routing context (RC) field 220, a sequence of one or more forwarding table identifiers fields (FTIFs) 230-1, 230-2, . . . , 230-N and an FTIF offset field 240.

Figure 7:
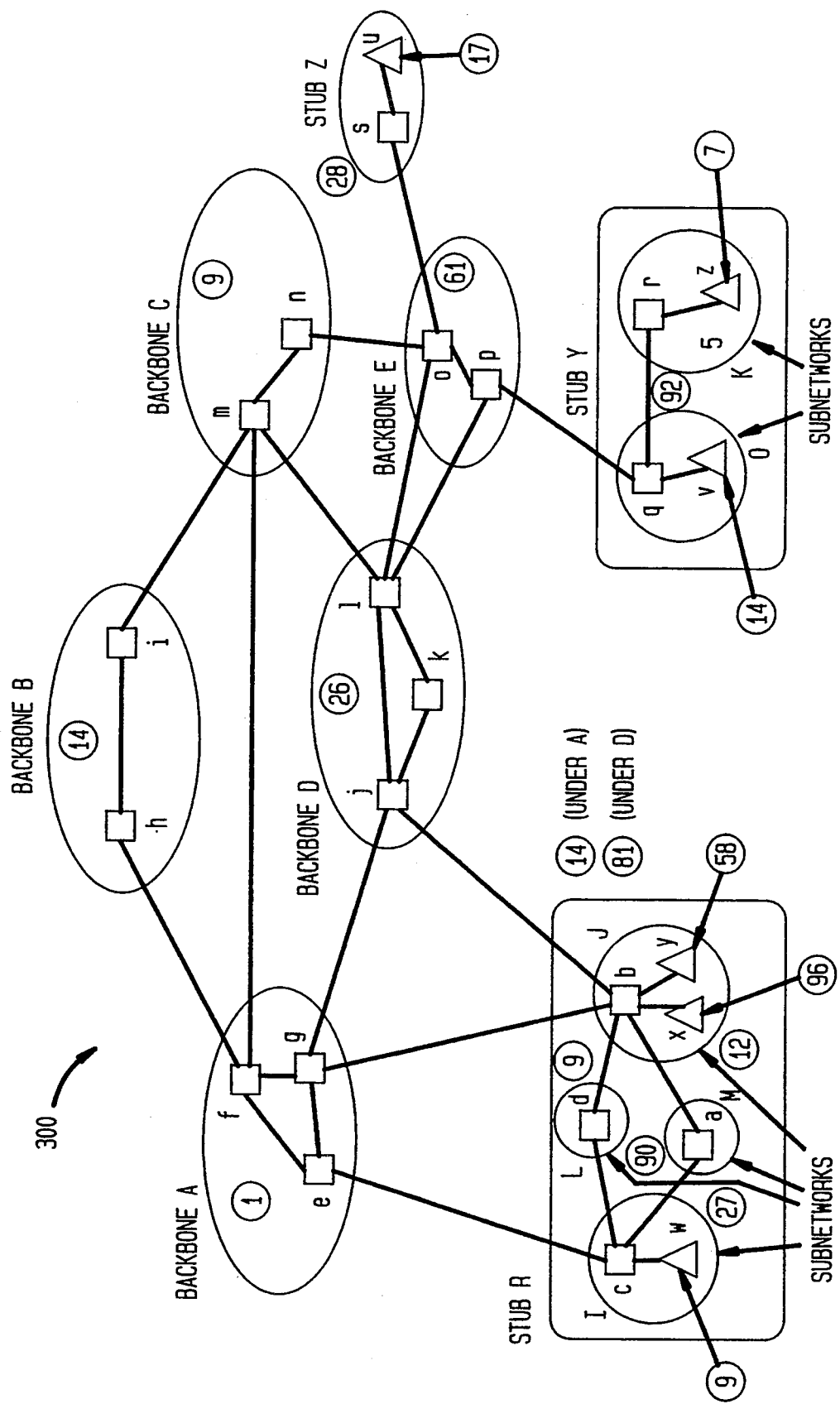
FIG. 7 depicts an exemplary internet which routes packets according to the present invention.

Referring now to FIG. 7, the invention is now discussed with reference to an exemplary embodiment. FIG. 7 shows an internet 300 in which identifiers have illustratively been hierarchically assigned, although this is only illustrative. The backbone networks A, B, C, D, E form the highest level of the hierarchy. The identifier 1 is assigned to the backbone network A. This assigned identifier and the assigned identifiers noted hereinafter are shown in FIG. 7 enclosed in circles to distinguish them from reference numerals, which are not used in FIG. 7, except for internet 300. Rather, the backbone networks, the stubs, the subnetworks, the routers and the hosts are referenced with upper and lower case alphabetic characters. The identifier 14 is assigned to the backbone network B. The identifier 9 is assigned to the backbone network C. The identifier 26 is a assigned to the backbone network D. The identifier 61 is assigned to the backbone E. Each backbone assigns an identifier to each stub network (which stub networks form the second highest level in the hierarchy) connected thereto. Thus, the backbone network E assigns the identifier 92 to the stub network Y and the identifier 28 to the stub network z. The stub network R has two identifiers 14 and 81; one under the backbone A and one under the backbone D. This is because each of the backbone networks A and D assigns an identifier to the stub network R independently of each other. This ensures that the stub network R is assigned an identifier which is unique over all stub networks connected to the backbone A on one hand and an identifier which is unique over all stub networks connected to the backbone network D on the other hand. Similarly, each stub network R,Y,Z assigns an identifier to each subnetwork (which subnetworks form the third highest level in the hierarchy) contained therein. For example, the stub network R assigns the identifier 12 to the subnetwork J. The stub network R assigns the identifier 27 to the subnetwork I. The stub network R assigns the identifier 9 to the subnetwork L. The stub network R assigns the identifier 90 to the subnetwork M. Each subnetwork assigns an identifier to each node (which nodes form the lowest level in the hierarchy) contained therein. For example, the subnetwork J assigns the identifier 58 to the node y and the identifier 96 to the node x.

Suppose a source node x desires to transmit a packet to the destination node z. In such a case, the source node x generates a packet having a routing directive as shown in FIG. 8. As shown, the source node x writes the identifier 96 associated with the source node x in a first FTIF 410. Similarly, the node x writes the identifier 12 associated with the subnetwork J in the next FTIF 420. Likewise, the node x writes the identifiers of the stub network R, backbone network A, backbone network E, stub network Y, subnetwork K and destination node z in the FTIFs 430, 440, 450, 460, 470, and 480, respectively. The selection of this particular sequence of identifiers is only illustrative. As discussed in greater detail below, the node x may write a different sequence of identifiers in the packet, e.g., to specify the internet systems via which the packet propagates with greater particularity.

Illustratively, the node x writes a pointer which points to the FTIF 450 in the FTIF offset field 485. For example, the pointer is set equal to 5 to point to the fifth FTIF 450 (which pointed to FTIF 450 is shown highlighted) in the sequence of FTIFs in the header 200 (FIG. 6). As discussed in greater detail below, there is a great deal of freedom in selecting the pointer so as to ensure that the packet is transmitted via a particular sequence of internet systems. The node x also writes a value into a hierarchy level subfield of the RC field 495 indicating that the FTIF pointed to by the pointer contains an identifier of an internet system of the highest level in the hierarchy. Illustratively, the RC field 495 contains several additional subfields (not shown in FIG. 8), each of which may be used to control a different aspect of routing as discussed below.

Illustratively, the source node x transmits the packet to the next node on the route to the destination node z. First, the node x uses all of the values stored in the RC field 495, collectively as a single parameter to select one forwarding table from a set of forwarding tables maintained in a memory at the node x. For example, each subfield of the RC may be one or more bits which when appended together form a single parameter. In this case, the parameter of the RC field 495 merely indicates that a table suitable for indexing with identifiers associated with internet systems of the highest level in the hierarchy (i.e., backbone networks) should be selected. The node x then uses the identifier 61 in the FTIF 450 pointed to by the pointer 5 stored in the FTIF offset field 485 to index the selected forwarding table. The node x then transmits the packet to the node indicated by the retrieved table entry.

Figure 14:
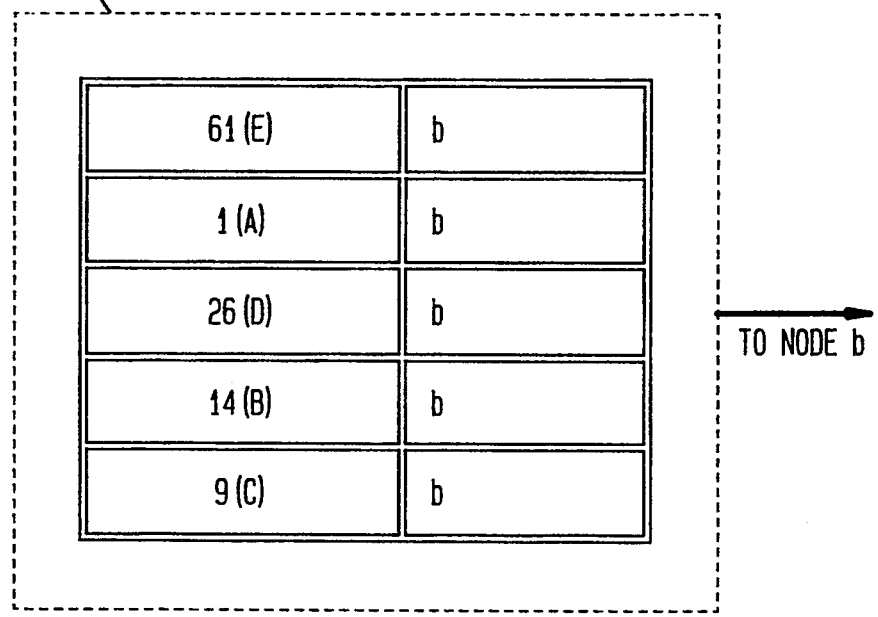
FIG. 14 depicts an exemplary node and one forwarding table stored in memory at that node in the internet of FIG. 7.

FIG. 14 shows node x and one of the forwarding tables stored in memory therein.

As noted in FIG. 14 the retrieved table entry indicates that the packet should be transmitted to the node b. The node b receives the packet and carries out similar steps as performed at the node x. First the node b uses the parameter stored in the RC field 495 to select an appropriate forwarding table from a set of forwarding tables stored in a memory at the node b, i.e., a forwarding table suitable for indexing with identifiers corresponding to internet systems of the highest level. The node b then utilizes the identifier 61 stored in the FTIF 450 pointed to by the pointer 5 stored in the FTIF offset field 485 to index an entry in the selected forwarding table.

Figure 15:
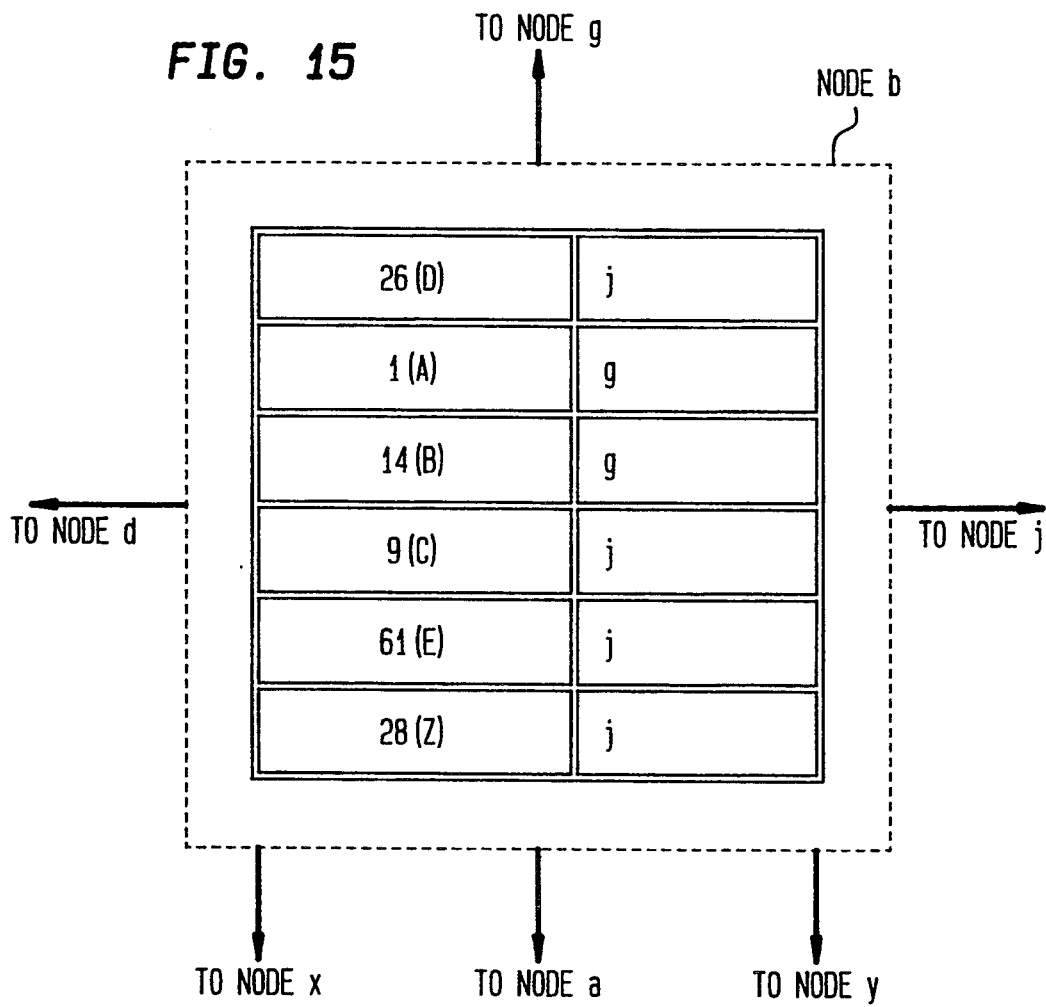
FIG. 15 depicts a second exemplary node and one forwarding table stored in memory at that second node in the internet of FIG. 7.

FIG. 15 shows node b and one of the forwarding tables stored in memory therein. The node b then transmits the packet to the node indicated by the indexed entry in the selected forwarding table, e.g., the node j.

In a similar fashion, the packet may illustratively be transmitted from the node j to the node 1. At the node 1, similar steps are carried out to transmit the packet from the node 1 to, e.g., the node p. As before, the node 1 uses a forwarding table selected from a set of forwarding tables stored at the node 1 by the parameter stored in the RC field 495. Furthermore, the node 1 indexes the selected forwarding table using the identifier 61 stored in the FTIF 450 pointed to by the pointer 5 stored in the FTIF offset field 485. However, in addition to an indication to transmit the packet to the node p, the indexed forwarding table entry at node 1 also includes an instruction for changing the pointer in the packet header so that the pointer points to the next FTIF 460. Illustratively such a change is made because the node p to which the packet will be transmitted is in the backbone E corresponding to the identifier 61 stored in the FTIF 450 currently pointed to by the pointer in the FTIF offset field 485. Thus, starting with the node p, it will be necessary to utilize the next identifier of the sequence of identifiers for routing the packet. (It is also possible, as discussed in greater detail below, for the node x to write a different sequence of identifiers in the packet. For example, the node x could have included the identifier 26 for the backbone network D in an FTIF inserted between the FTIF 440 and the FTIF 450 of the routing directive of FIG. 8. Assuming that the pointer initially pointed to this inserted FTIF containing the identifier 26, similar steps carried out at the node p described above would be carried out at the node b to change the pointer to point to the identifier 61 in the FTIF 450 just prior to transmitting the packet to the node j.) In addition, the indexed table entry includes a value to be stored in the hierarchy level subfield of the RC field 495 which indicates the hierarchy level of the internet system associated with the identifier pointed to by the modified pointer. The purpose of updating this subfield of the RC field 495 in this manner is so that it accurately corresponds to the identifier in the FTIF 460 pointed to by the modified pointer 6 in the FTIF offset field 485. That is, the value stored in the hierarchy level indicator of the RC field is modified to indicate that the identifier 92 in the FTIF 460 pointed to by the modified pointer 6 corresponds to an internet system on the second highest level of the hierarchy. In response to this indexed entry, the node 1 modifies the pointer in the FTIF offset field 485 so that it points to the FTIF 460 and writes the new value in the hierarchy level subfield of the RC field 495. This modified routing directive of the packet header is shown in FIG. 9 (with the pointed to FTIF 460 highlighted). The node 1 then transmits the packet to the node p.

Similar steps carried out at the node 1 are carried out at the node p which illustratively transmits the packet to the node q in the stub network 0. Thus, the node p uses the forwarding table of a set of forwarding tables maintained in a memory at the node p selected by the parameter stored in the RC field 495. In this case, the node p uses a forwarding table suitable for indexing with identifiers associated with internet systems of the second highest level in the hierarchy. The node p indexes the selected forwarding table using the identifier 92 in the FTIF 460 pointed to by the pointer 6 stored in the FTIF offset field 485. In this case, the node q indicated by the indexed forwarding table entry is in the network Y associated with the identifier stored in the FTIF 460. As such, this indexed forwarding table entry contains an instruction causing the node p to write a pointer 7 pointing to the FTIF 470 in the FTIF offset field 485. Furthermore, the indexed forwarding table entry contains a new value which the node p stores in the hierarchy level subfield of the RC field 495 indicating that the identifier stored in the FTIF 470 is for an internet system on the third highest level of the hierarchy. This modified packet is shown in FIG. 10 (with the pointed to FTIF 470 highlighted).

The packet is similarly modified by the node q as shown in FIG. 11 and transmitted from the node q to the node r. The packet is then transmitted from the node r to the node z similar to as described above.

The above process may be easily modified to achieve different kinds of routing. This is because a source node may place any number of identifiers in the routing directive and/or force the internet systems to initially route based on any one of those identifiers by changing the pointer.

For example, despite placing the identifier for the backbone network A in the FTIF 440, the packet was not routed via the backbone network A. However, the source node x could have ensured that the packet was routed via this backbone network by simply writing a pointer 4 pointing to this FTIF 440 in the FTIF offset field 485. This would have forced the node b to transmit the packet to the node g in the backbone A.

It is also possible for the source node x to specify exactly through which backbone networks the packet should be transmitted by simply placing a specific sequence of identifiers and an appropriate pointer in the routing directive. This form of routing is called "policy routing" L. Breslau and D. Estrin, "Design of Interadministrative Domain Routing Protocols" SIG-COMM 90, p. 231, Sept., 1990. For example, as shown in FIG. 12, the node x could have written the sequence of identifiers for the internet systems x, J, R, A, B, C, E, Y, K, z in the sequence of FTIFs 401, 411, 421, 431, 441, 451, 461, 471, 481, 491, and written the pointer 4 in the FTIF offset field pointing to the FTIF 431. As shown in FIG. 12, additional information (depicted as an arrow or dash) is included with each identifier indicating whether the next identifier in the sequence is associated with an internet system of a higher (up arrow), lower (down arrow), or same (dash) level in the hierarchy. Illustratively, the extra information is used collectively with the identifier to access a forwarding table at a node to retrieve a particular entry. Thus, the particular retrieved entry also depends on this additional information. The purpose for providing the extra information is to correctly maintain the consistency between the value stored in the hierarchy level subfield of the RC field 495 and the FTIF pointed to by the pointer in the case that the pointer must be modified before transmitting the packet. According to this embodiment, three entries are provided for each identifier, one entry for each combination of the identifier and one of the three types of additional information. Suppose the additional information used to form the index indicates that the next identifier in the sequence of identifiers corresponds to a higher level in the hierarchy. In such a case, an indexed entry is retrieved from the forwarding table containing an appropriate value for storage in the hierarchy level subfield of the RC field 495 which value indicates the next higher level in the hierarchy. On the other hand, suppose the additional information indicates that the next identifier in the sequence of identifiers corresponds to a lower level in the hierarchy. In this case, an indexed entry is retrieved from the forwarding table containing an appropriate value for storage in the hierarchy level subfield of the RC field 495 which value indicates the next lower level in the hierarchy. If the additional information indicates that the identifier in the next FTIF corresponds to the same level in the hierarchy, then an indexed entry is retrieved which does not contain a value to be stored in the hierarchy level subfield of the RC field 495.

The routing directive of FIG. 12 forces the packet to be transmitted from the stub network R to the backbone network A. Just prior to transmitting the packet to the backbone network A, the pointer would be changed to 5 (e.g., at the node b in the fashion discussed above) so as to point to the FTIF 441 storing the identifier for the backbone network B. This forces the packet to be routed by nodes in the backbone network A to the backbone network B. Similarly, just prior to transmitting the packet to the backbone network B, the pointer would be changed to (e.g., at the node f) so as to point to the FTIF 451 storing the identifier for the backbone network C. This forces the packet to be routed by nodes in the backbone network B to the backbone network C, and so on.

The identifiers placed in the routing directive by the source node may be any values suitable for indexing a forwarding table such as a virtual path identifier in virtual path routing. See W. STALLINGS, HANDBOOK AND BOOK OF COMPUTER COMMUNICATION STANDARDS, Vol. 1, chap. 5.5 (1990). In virtual path routing according to the present invention, a virtual path is established in the internet by initially transmitting a call setup packet from a source node to a destination node in a fashion such as described above. As the packet propagates through particular nodes of the internet, each node which receives the call setup packet creates an entry in its forwarding table which is indexed by a particular virtual path identifier and stores the node to which the packet must be transmitted in this created table entry. Thereafter, as shown in FIG. 13, a source node transmits packets to the destination node by placing the virtual path identifier in an FTIF 412, (or sequence of virtual path identifiers in a sequence of FTIFs), and a pointer in the FTIF offset field 487 pointing to the FTIF containing the first virtual path identifier. Illustratively, the source node also writes a particular value in a subfield of the RC field 497 indicating that the packet is to be routed via virtual path routing.

To transmit the packet, a node uses the parameter stored in the RC field 497 of the routing directive to select a particular forwarding table maintained at that node. In this case, the parameter indicates that a forwarding table suitable for use in virtual path routing should be selected, i.e., the forwarding table in which the node had previously created a table entry during the setup procedure described above. The node then uses the virtual path identifier stored in the FTIF 412 pointed to by the pointer in the FTIF offset field 487 to index the previously created entry. The node then routes the packet to the node indicated in the retrieved forwarding table entry.

As discussed above, the contents of the RC field can be used to control routing by causing the node to select a particular forwarding table for use in routing. The forwarding tables at each node can be constructed to route a packet according to any number of selectable criteria. Thus, the RC field can be used to effect different QOS such as high throughput, low delay, low error, and low cost. See J. Moy, "OSPF version 2", RFC-1247, USC/Information Sciences Institute, July, 1991; International Organization for Standardization ISO 10589, "Intermediate System to Intermediate System Intra-Domain Routing Exchange Protocol for Use in Conjunction with the Protocol for Providing the Connectionless-mode Network Service" (ISO 8473). For example, a subfield of the RC can be designated for selecting low delay routing. If a node writes an appropriate value in this subfield, then the parameter selects a forwarding table at each node which routes the packet to a node on a low delay route to the destination node.

The RC field may also be used by intermediary nodes to temporarily reroute packets via an alternate route, e.g., to avoid a congested area of the internet. See I. McQuillan, J. Richer & E. Rosen, "The New Routing Algorithm for the ARPANET" IEEE Trans. on Comm., vol. COM-28, no. 5, p. 711-19 May 1980; Z. Wang, J. Crowcroft, "Shortest Path First with Emergency Exits", Proc. of SIGCOMM (1990). In this embodiment, if a particular node which receives a packet determines that the packet is to be transmitted to another node in a congested area of the internet, the particular node may alter the contents of the RC field. For instance, the particular node may write a value in a subfield indicating that the packet is to be routed via an alternate route. Thereafter, each receiving node which transmits the packet will use the modified parameter in the RC field to select a forwarding table predetermined for routing a packet via the alternate route. If further congestion is encountered, the parameter may be changed to indicate that a second, third, . . . , etc., alternate route forwarding table should be used.

The RC field may also have a subfield for performing multicast routing. Multicast routing is a type of routing in which a packet transmitted from a source node is replicated in one or more intermediary nodes. Each copy of the packet is transmitted to its own destination node. See S. Deering, "Multicast Routing in Internetworks and Extended LANs", SIGCOMM, p. 55, Aug., 16, 1988. As above, a node which receives such a packet uses the parameter stored in the RC field to select an appropriate forwarding table for performing multicast routing. The retrieved forwarding table entry may have an instruction for replicating the packet a number of times. The retrieved forwarding table entry would also indicate the next nodes to which each of the packets should be transmitted so that they reach their destinations.

In short, a general routing method is disclosed in which a source node writes in a packet header a sequence of identifiers and a pointer, which points to a particular one of the identifiers of the sequence. The source node may also write particular values in subfields of a RC field in order to control the routing of the packet. A node which receives such a packet collectively uses the values stored in the RC field as a parameter for selecting a forwarding table from a set of forwarding tables stored in a memory at that receiving node. The receiving node retrieves an entry from the selected forwarding table indexed by the identifier in the sequence pointed to by the pointer. The receiving node then transmits the packet to another node indicated by the retrieved entry. Because routing according to the present invention is general, it is easily adapted to route packets according to different routing styles and criteria.

The invention has been described above with reference to specific embodiments. However, this was only illustrative. Numerous other embodiments may be devised by one having ordinary skill in the art without departing from the spirit or scope of the following claims.

1. A method for transmitting via a sequence of nodes in a network a packet containing a sequence of identifiers and a pointer pointing to a particular identifier in said sequence of identifiers comprising the steps of:
   at one of said nodes in which said packet is located, selecting a particular forwarding table from a set of forwarding tables maintained in a memory at said one node,
   retrieving an entry from said selected forwarding table in response to said particular identifier pointed to by said pointer, and
   transmitting said packet to a second node of said sequence of nodes indicated by said retrieved entry.

2. The method of claim 1 wherein said packet further comprises a routing context parameter and wherein said forwarding table is selected in response to said routing context parameter.

3. The method of claim 1 further comprising the step of, in response to said retrieved entry, changing said pointer to a different pointer which points to a different identifier in said sequence of identifiers.

4. The method of claim 3 further comprising the steps of:
   receiving said packet at said second node of said sequence of nodes,
   at said second node, selecting a second forwarding table from a second set of forwarding tables maintained in a memory at said second node,
   retrieving an entry from said second selected forwarding table in response to said different identifier pointed to by said different pointer, and
   transmitting said packet to a third node of said sequence of nodes indicated by said entry retrieved from said second selected forwarding table.

5. The method of claim 1 wherein said packet is a multicast packet and wherein said node transmits each of a plurality of copies of said packet to a different node.

6. The method of claim 2 further comprising the step of modifying said routing context parameter in said packet to select a particular forwarding table at each successive node of said sequence of nodes via which said packet is transmitted.

7. The method of claim 2 further comprising the step of modifying said routing context parameter to reroute said packet around congestion in said sequence of nodes via which said packet is transmitted.

8. The method of claim 2 further comprising the step of modifying said routing context parameter in response to said retrieved entry.

9. The method of claim 2 wherein said routing context parameter identifies a desired transmission delay of said packet in said network.

10. The method of claim 1 wherein said network is an internet.

11. The method of claim 10 wherein said internet comprises a plurality of backbone networks which backbone networks contain at least one interconnected node, wherein said sequence of nodes via which said packet is transmitted includes at least one node contained in at least one of said backbone networks, and wherein said sequence of identifiers comprises one identifier associated with each of said backbone networks containing at least one of said nodes via which said packet is transmitted.

12. The method of claim 1 wherein at least one of said identifiers in said sequence of identifiers is a virtual path identifier.

13. The method of claim 2 wherein said routing context parameter identifies a quality of service for transmitting said packet in said network.

14. A method for transmitting via a sequence of nodes a packet containing a routing context parameter comprising the steps of:
   at one of said nodes in which said packet is located, selecting a forwarding table from a set of forwarding tables maintained in a memory at said one node, which forwarding table is selected in response to said routing context parameter,
   retrieving an entry from said selected forwarding table in response to routing information contained in the packet, and
   transmitting said packet to a second node of said sequence of nodes indicated by said retrieved entry.

15. The method of claim 14 wherein said routing information comprises a sequence of identifiers and a pointer pointing to a particular identifier in said sequence of identifiers, wherein said entry is retrieved from said selected forwarding table in response to said particular identifier pointed to by said pointer.

16. The method of claim 14 further comprising the step of modifying said routing context parameter to select a particular forwarding table at each successive node of said sequence of nodes via which said packet is transmitted.

17. A method for transmitting a packet from a source node to a destination node via a sequence of intermediary nodes in a network comprising the steps of:
   at the source node, prior to transmission, writing in the packet a sequence of identifiers and a pointer pointing to a particular identifier in said sequence of identifiers,
   at one of said intermediary nodes in which said packet is located, selecting a particular forwarding table from a set of forwarding tables maintained in a memory at said one intermediary node,
   retrieving an entry from said selected forwarding table at said one intermediary node in response to said particular identifier pointed to by said pointer, and
   transmitting said packet to a next node that is indicated by said retrieved entry.

18. The method of claim 17 further comprising at said one intermediary node the step of, in response to said retrieved entry, changing said pointer to a different pointer which points to a different identifier in said sequence of identifiers.

19. The method of claim 18 further comprising the steps of:

receiving said packet at said next node of said sequence of intermediary nodes, at said next node, selecting a second forwarding table from a second set of forwarding tables maintained in a memory at said next node.

retrieving an entry from said second selected forwarding table in response to said different identifier pointed to by said different pointer, and transmitting said packet to a further next intermediary node of said sequence of nodes indicated by said entry retrieved from said second selected forwarding table.

20. The method at claim 17 further comprising the step at said source node of writing a routing context parameter in the packet and wherein at said intermediary node said forwarding table is selected in response to said routing context parameter.

21. The method of claim 20 further comprising the step of modifying said routing context parameter to select a particular forwarding table at each successive node of said sequence of intermediary nodes via which said packet is transmitted.

22. A method for transmitting a packet from a source node to a destination node via a sequence of intermediary nodes in a network comprising the steps of:

at the source node, prior to transmission, writing in the packet a sequence of identifiers and a pointer pointing to a particular identifier in said sequence of identifiers, at one of said intermediary nodes in which said packet is located and where at said one intermediary node a forwarding table is maintained in a memory, retrieving an entry from said forwarding table in response to said particular identifier pointed to by said pointer, and transmitting said packet to a next node that is indicated by said retrieved entry.

23. The method of claim 22 further comprising at said one intermediary node the step of, in response to said retrieved entry, changing said pointer to a different pointer which points to a different identifier in said sequence of identifiers.

24. The method of claim 23 further comprising the steps of:

receiving said packet at said next node of said sequence of intermediary nodes, at said next node, selecting a second forwarding table from a second set of forwarding tables maintained in a memory at said next node, retrieving an entry from said second selected forwarding table in response to said different identifier pointed to by said different pointer, and transmitting said packet to a further next intermediary node of said sequence of nodes indicated by said entry retrieved from said second selected forwarding table.

* * * * *